US012664981B2

(12) United States Patent
Yadav et al.

(10) Patent No.: US 12,664,981 B2
(45) Date of Patent: Jun. 23, 2026

(54) PARAPHRASE AND AGGREGATE WITH LARGE LANGUAGE MODELS FOR IMPROVED DECISIONS

(71) Applicant: SAMSUNG ELECTRONICS CO., LTD., Suwon-si (KR)

(72) Inventors: Vikas Yadav, San Jose, CA (US); Zheng Tang, Mountain View, CA (US); Vijay Srinivasan, San Jose, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 18/781,617

(22) Filed: Jul. 23, 2024

(65) Prior Publication Data

US 2025/0037710 A1    Jan. 30, 2025

Related U.S. Application Data

(60) Provisional application No. 63/528,798, filed on Jul. 25, 2023.

(51) Int. Cl.
| | |
|---|---|
| *G10L 15/18* | (2013.01) |
| *G10L 15/16* | (2006.01) |
| *G10L 15/22* | (2006.01) |

(52) U.S. Cl.
CPC .......... *G10L 15/1815* (2013.01); *G10L 15/16* (2013.01); *G10L 15/22* (2013.01)

(58) Field of Classification Search
CPC .......... G10L 15/16; G10L 15/18; G10L 15/22
See application file for complete search history.

(56) References Cited

U.S. PATENT DOCUMENTS

| | | | |
|---|---|---|---|
| 11,075,862 | B2 | 7/2021 | TeNyenhuis et al. |
| 11,270,074 | B2 | 3/2022 | Iwase et al. |
| | | (Continued) | |

FOREIGN PATENT DOCUMENTS

| | | |
|---|---|---|
| CN | 110299136 A | 10/2019 |
| CN | 111538766 A | 8/2020 |
| JP | 2021-149909 A | 9/2021 |

OTHER PUBLICATIONS

Witteveen, Sam, and Martin Andrews. "Paraphrasing with large language models." arXiv preprint arXiv:1911.09661 (2019). (Year: 2019).*

(Continued)

*Primary Examiner* — Jialong He
(74) *Attorney, Agent, or Firm* — Sughrue Mion, PLLC

(57) ABSTRACT

A method of interpreting a verbal input, may include: assigning a meaning classification to the verbal input, and a confidence score to the meaning classification; and based on the confidence score corresponding to the meaning classification of the verbal input being less than or equal to a threshold, generating at least one paraphrase of the verbal input using at least one large language model (LLM); assigning the meaning classification to the at least one paraphrase, and the confidence score to the meaning classification; and concatenating the verbal input, the at least one paraphrase, the meaning classification, and the confidence score to generate a concatenated input; inputting the concatenated input into the at least one LLM.

20 Claims, 6 Drawing Sheets

(56) References Cited

U.S. PATENT DOCUMENTS

| | | | | |
|---|---|---|---|---|
| 11,315,560 | B2 | 4/2022 | Heltewig et al. | |
| 11,587,567 | B2 | 2/2023 | Carmeli et al. | |
| 11,625,630 | B2 | 4/2023 | Katz et al. | |
| 11,657,810 | B2 | 5/2023 | Jones et al. | |
| 2011/0294525 | A1 | 12/2011 | Jonsson | |
| 2016/0148612 | A1 | 5/2016 | Guo et al. | |
| 2019/0354578 | A1* | 11/2019 | Shen | G06F 40/40 |
| 2022/0171930 | A1 | 6/2022 | Jalaluddin et al. | |
| 2022/0172021 | A1 | 6/2022 | Hoang et al. | |
| 2022/0237233 | A1 | 7/2022 | Gupta et al. | |
| 2023/0141398 | A1* | 5/2023 | Bahdanau | G06F 40/30 |
| | | | | 704/9 |
| 2023/0350929 | A1* | 11/2023 | Hasan | G06N 5/022 |
| 2023/0359932 | A1* | 11/2023 | Ayan | G06N 20/00 |
| 2023/0376696 | A1 | 11/2023 | Duong et al. | |

OTHER PUBLICATIONS

Palivela, Hemant. "Optimization of paraphrase generation and identification using language models in natural language processing." International Journal of Information Management Data Insights 1.2 (2021) (Year: 2021).*

Hegde, Chaitra, and Shrikumar Patil. "Unsupervised paraphrase generation using pre-trained language models." arXiv preprint arXiv:2006.05477 (2020). (Year: 2020).*

Yadav, Vikas, Zheng Tang, and Vijay Srinivasan. "Paraphrase and Aggregate with Large Language Models for Minimizing Intent Classification Errors." arXiv preprint arXiv:2406.17163 (2024). (Year: 2024).*

Witteveen, S., & Andrews, M. (2019). "Paraphrasing with Large Language Models". Conference on Empirical Methods in Natural Language Processing. 7 pages.

Portillo Wightman, G., DeLucia, A., & Dredze, M. (2023). "Strength in Numbers: Estimating Confidence of Large Language Models by Prompt Agreement". Proceedings of the 3rd Workshop on Trustworthy Natural Language Processing (TrustNLP 2023). 37 pages.

International Search Report (PCT/ISA/210) and Written Opinion (PCT/ISA/237) issued by the International Searching Authority on Oct. 30, 2024 in corresponding International Application No. PCT/KR2024/010782.

Jan Cegin et al., "ChatGPT to Replace Crowdsourcing of Paraphrases for Intent Classification: Higher Diversity and Comparable Model Robustness", May 22, 2023, 11 pages, arXiv:2305.12947v1 [cs.CL], XP091515214.

Communication issued on Apr. 8, 2026 by the European Patent Office in European Patent Application No. 24846057.8.

* cited by examiner

200

400

PARAPHRASE AND AGGREGATE WITH LARGE LANGUAGE MODELS FOR IMPROVED DECISIONS

CROSS REFERENCE TO RELATED APPLICATION

This application claims priority from U.S. Provisional Patent Application No. 63/528,798, filed with the United States Patent and Trademark Office on Jul. 25, 2023, the disclosure of which is incorporated herein by reference in its entirety.

BACKGROUND

1. Field

The disclosure concerns artificial intelligence (AI) and large language models (LLM). More specifically, the disclosure concerns methods that can use an LLM to correctly address queries.

2. Description of Related Art

Recent progress on generative AI has had a transformative effect on the fields of natural language processing (NLP) and machine learning (ML). LLMs have received more attention for generative tasks such as question answering, dialogue, summarization, etc. Decision making tasks such multi-class classification are extensively utilized in real-world scenarios and are useful when evaluating LLMs considering their capability to solve a wide range of NLP tasks.

LLMs may be used for large multi-class classification tasks. Recent approaches like self-consistency are less applicable for straightforward classification tasks as the generated text is a single word (or a phrase) denoting label of the class. Similarly, other sampling techniques (or temperature scaling) are important for diverse generation but not suitable for classification tasks where words with highest probabilities should be selected as the predicted class label.

These shortcomings negatively impact the ability of present day LLMs to correctly address queries.

SUMMARY

One or more embodiments provide a method and apparatus for interpreting a verbal input.

According to one or more example embodiments, a method of interpreting a verbal input, may include: obtaining a verbal input; assigning a meaning classification to the verbal input, and a confidence score to the meaning classification; and based on the confidence score corresponding to the meaning classification of the verbal input being less than or equal to a threshold, generating at least one paraphrase of the verbal input using at least one large language model (LLM); assigning a meaning classification to the at least one paraphrase, and a confidence score to the meaning classification; concatenating the verbal input, the at least one paraphrase, the meaning classification, and the confidence score to generate a concatenated input; inputting the concatenated input into the at least one LLM; selecting one of the at least one paraphrase or the verbal input, and its corresponding meaning classification, as an interpreted verbal input and an interpreted meaning classification, based on an output of the at least one LLM generated from the concatenated input; and executing an operation based on at least one of the interpreted verbal input or the interpreted meaning classification.

The method may further include: based on the confidence score corresponding to the meaning classification of the verbal input being higher than the threshold, inputting the verbal input into the at least one LLM; selecting the verbal input and its corresponding meaning classification as the interpreted verbal input and the interpreted meaning classification, based on an output of the at least one LLM generated from the verbal input; and executing the operation based on the interpreted verbal input and its corresponding meaning classification.

The method may further include: based on the confidence score of the interpreted verbal input being less than or equal to the threshold, determining that the verbal input is out-of-domain.

The method may further include: prior to concatenating the verbal input, the at least one paraphrase, the meaning classification, and the confidence score, selecting phrases from among the verbal input and the at least one paraphrase that have confidence scores exceeding the threshold. The concatenation may be performed on the selected phrases and their corresponding meaning classifications and confidence scores to obtain the concatenated input.

The verbal input may be a user inquiry, and the operation executed may be to generate and output a response to the user inquiry.

The at least one LLM may be used to generate and output the response to the user inquiry.

According to one or more example embodiments, an electronic device may include: at least one processor; at least one memory configured to store instructions that, when executed by the at least one processor, cause the electronic device to: obtain a verbal input; assign a meaning classification to the verbal input, and a confidence score to the meaning classification; and based on the confidence score corresponding to the meaning classification of the verbal input being less than or equal to a threshold, generate at least one paraphrase of the verbal input using at least one large language model (LLM); assign a meaning classification to the at least one paraphrase, and a confidence score to the meaning classification; concatenate the verbal input, the at least one paraphrase, the meaning classification, and the confidence score to generate a concatenated input; input the concatenated input into the at least one LLM; select one of the at least one paraphrase or the verbal input, and its corresponding meaning classification, as an interpreted verbal input and an interpreted meaning classification, based on an output of the at least one LLM generated from the concatenated input; and execute an operation based on at least one of the interpreted verbal input or the interpreted meaning classification.

The instructions may further cause the electronic device to: based on the confidence score corresponding to the meaning classification of the verbal input being higher than the threshold, input the verbal input into the at least one LLM; select the verbal input and its corresponding meaning classification as the interpreted verbal input and the interpreted meaning classification, based on an output of the at least one LLM generated from the verbal input; and execute the operation based on the interpreted verbal input and its corresponding meaning classification.

The instructions may further cause the electronic device to: based on the confidence score of the interpreted verbal input being less than or equal to the threshold, determine that the verbal input is out-of-domain.

The instructions may further cause the electronic device to: prior to concatenating the verbal input, the at least one paraphrase, the meaning classification, and the confidence score, select phrases from among the verbal input and the at least one paraphrase that have confidence scores exceeding the threshold. The concatenation may be performed on the selected phrases and their corresponding meaning classifications and confidence scores to obtain the concatenated input.

The verbal input may be a user inquiry, and the operation executed may be to generate and output a response to the user inquiry.

The at least one LLM may be used to generate and output the response to the user inquiry.

The electronic device may further include a display. The operation executed may be to generate and display the response to the user inquiry on the display.

The electronic device may further include a speaker. The operation executed may be to generate and play the response to the user inquiry on the speaker.

According to one or more example embodiments, a non-transitory computer readable medium may include instructions which, when the instructions are executed by at least one processor, cause the at least one processor to carry out: obtaining a verbal input; assigning a meaning classification to the verbal input, and a confidence score to the meaning classification; and based on the confidence score corresponding to the meaning classification of the verbal input being less than or equal to a threshold, generating at least one paraphrase of the verbal input using at least one large language model (LLM); assigning a meaning classification to the at least one paraphrase, and a confidence score to the meaning classification; concatenating the verbal input, the at least one paraphrase, the meaning classification, and the confidence score to generate a concatenated input; inputting the concatenated input into the at least one LLM; selecting one of the at least one paraphrase or the verbal input, and its corresponding meaning classification, as an interpreted verbal input and an interpreted meaning classification, based on an output of the at least one LLM generated from the concatenated input; and executing an operation based on at least one of the interpreted verbal input or the interpreted meaning classification.

The instructions may further cause the at least one processor to carry out: based on the confidence score corresponding to the meaning classification of the verbal input being higher than the threshold, inputting the verbal input into the at least one LLM; selecting the verbal input and its corresponding meaning classification as the interpreted verbal input and the interpreted meaning classification, based on an output of the at least one LLM generated from the verbal input; and executing the operation based on the interpreted verbal input and its corresponding meaning classification.

The instructions may further cause the at least one processor to carry out: based on the confidence score of the interpreted verbal input being less than or equal to the threshold, determining that the verbal input is out-of-domain.

The instructions may further cause the at least one processor to carry out: prior to concatenating the verbal input, the at least one paraphrase, the meaning classification, and the confidence score, selecting phrases from among the verbal input and the at least one paraphrase that have confidence scores exceeding the threshold. The concatenation is performed on the selected phrases and their corresponding meaning classifications and confidence scores to obtain the concatenated input.

The verbal input may be a user inquiry, and the operation executed may be to generate and output a response to the user inquiry.

The at least one LLM may be used to generate and output the response to the user inquiry.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
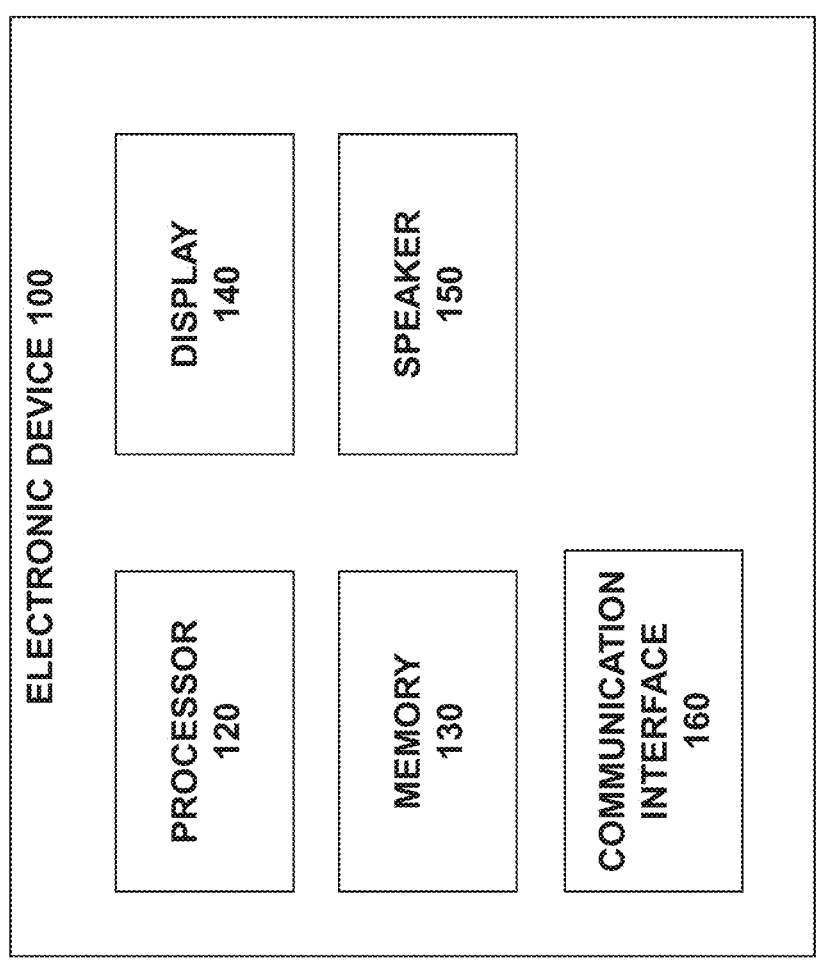
FIG. 1 is a block diagram of an electronic device according to one or more embodiments.

Hereinafter, the disclosure is described in detail with reference to the accompanying drawings.

General terms that are currently widely used are selected as possible as terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are described in detail in corresponding descriptions of the disclosure. Therefore, the terms used in the disclosure need to be defined based on the meanings of the terms and the content throughout the disclosure rather than simple names of the terms.

In the disclosure, an expression "have," "may have," "include," "may include," or the like, indicates the existence of a corresponding feature (for example, a numerical value, a function, an operation, or a component such as a part), and does not exclude the existence of an additional feature.

Expressions, "at least one of A and B" and "at least one of A or B" and "at least one of A or B" should be interpreted to mean any one of "A" or "B" or "A and B." As another example, "performing at least one of steps 1 and 2" or "performing at least one of steps 1 or 2" means the following three juxtaposition situations: (1) performing step 1; (2) performing step 2; (3) performing steps 1 and 2. Expressions "first," "second," and the like, used in the specification may indicate various components regardless of the sequence and/or importance of the components. These expressions are used only to distinguish one component from another component, and do not limit the corresponding components.

When any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

In the specification, such a term as a "user" may refer to a person who uses an electronic apparatus or an apparatus (for example, an artificial intelligence electronic apparatus) which uses an electronic apparatus.

Hardware

FIG. 1 is a block diagram of an electronic device 100 according to one or more embodiments. The electronic device 100 may include at least one processor 120 and at least one memory 130. The at least one memory 130 may store instructions or software configured to cause the at least one processor 120 to perform the methods described herein. Electronic device 100 may be a dedicated computing device communicating over a network with several user devices. Electronic device 100 may be implemented by a plurality of servers, server units, or sub-servers (i.e. more than one computer) that may be directly connected electronically or connected over a network. Electronic device 100 may also be a server, smartphone, personal computer, wearable, tablet, or other suitable device. In some embodiments, electronic device 100 includes display 140 and speaker 150 to output e.g. responses to user inquiries to a user. In some embodiments, electronic device 100 includes communicaone or more embodiments, PAG-LLM is implemented by operations performed by the at least one processor 120 in electronic device 100.

Processes

Figures 2A, 2B:
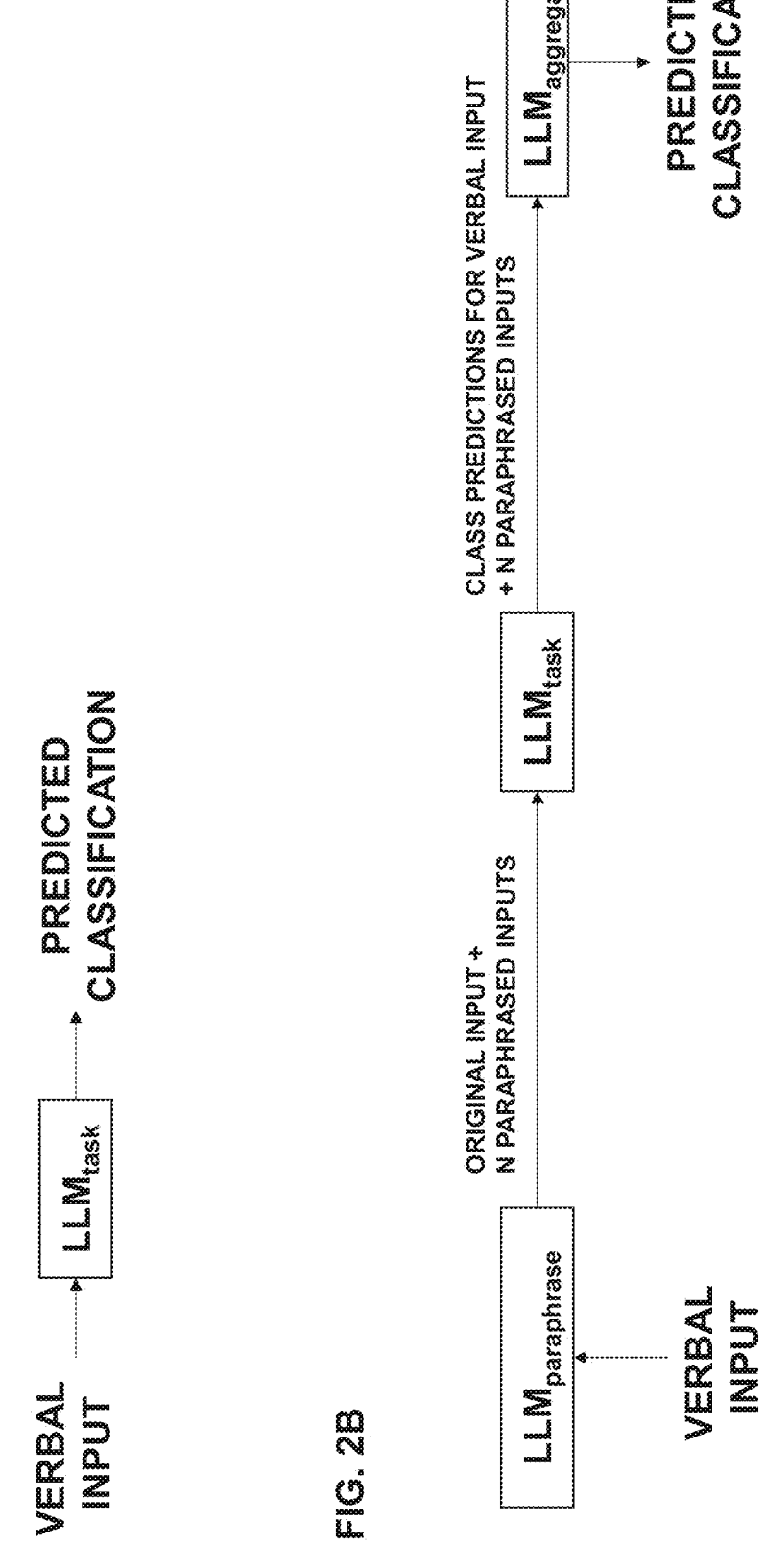
FIG. 2A is a flow chart of a method according to one or more embodiments.
FIG. 2B is a flow chart of a method according to one or more embodiments.

FIGS. 2A and 2B are flow charts of methods according to one or more embodiments. In particular, FIGS. 2A and 2B depict the process of PAG-LLM. FIG. 2A shows the first step where the LLM classifies the original query. If the classification confidence is low, the original query is given to the LLM for generating paraphrases which are in turn given to the LLM for classification. Finally, the LLM aggregates the predicted class labels from paraphrases and the original query.

The classifications are used to assist the LLM or query-answering software to answer queries. Different processes are used, and different data sources are accessed based on the classification of a query. Accordingly, correctly classifying a verbal input has a large impact on the accuracy of the output. Confidences are assigned to classification estimates generated by the LLM in order to judge the likelihood that a classification is correct. This assists the software to correctly classify inputs. Embodiments described herein can improve the ability to correctly classify verbal inputs.

The PAG-LLM decision process according to one or more embodiments is as follows:

Step 1) $LLM_{task}$—As shown in FIG. 2A, the LLM first predicts an intent class of the original utterance. If the confidence is higher than the threshold, the predicted label is the final label. But if the confidence is lower than the threshold, PAG-LLM goes to step 2.

Step 2) The LLM generates a plurality of paraphrases (e.g., 5) of the original query (denoted by $LLM_{paraphrase}$ block in FIG. 2B) which are fed to the LLM for classification decisions.

Step 3) At the end, text of input query and its paraphrases, their decisions and confidence scores are concatenated and input to the LLM for aggregating and generating the final decision.

TABLE 1

| | Input | Prediction | Confidence |
|---|---|---|---|
| Original: | what is the day off request status | request_status | 0.28 |
| Paraphrase 1: | Can you provide me with the status of my day off request? | pto_request_status | 0.98 |
| Paraphrase 2: | How is my day off request doing? | pto_request_status | 0.86 |
| Paraphrase 3: | What is the current status of my day off request? | pto_request_status | 0.98 |
| Paraphrase 4: | Could you let me know the status of my day off request? | pto_request_status | 0.98 |
| Paraphrase 5: | What is the update on my day off request status? | pto_request_status | 0.98 |
| | Final Prediction: pto_request_status | Gold Label: pto_request_status | |
| Original: | what is the reason humans even exist | explain_meaning_of_life | 0.11 |
| Paraphrase 1: | What is the purpose of human existence? | meaning_of_life | 0.32 |
| Paraphrase 2: | Why do humans exist in the world? | The meaning of life | 0.05 |
| Paraphrase 3: | What is the cause of human existence? | NULL | 0.07 |
| Paraphrase 4: | What is the explanation for the existence of humans? | explain_life | 0.21 |
| Paraphrase 5: | What is the rationale behind the existence of human beings? | rational_existence | 0.08 |
| | Final Prediction: meaning_of_life | Gold Label: meaning_of_life | | tion interface 160, and obtains an input and sends an output via communication interface 160.

In one or more embodiments, a (p)araphrasing and then (ag)gregating approach (PAG) is used to improve LLM on multi-class classification tasks. Utilizing the flexible and easy applicability of LLMs, paraphrases of the input query are generated using an LLM. Classification predictions are generated for the original query and its N paraphrases using the same LLM classifier. Finally, PAG-LLM aggregates the input and paraphrased texts, classification decisions (and LLM's confidence) for generating the final prediction. In TABLE 1 shows examples from CLINC dataset, where LLM classifies incorrect label (first example) and out-of-vocabulary (OOV) class label (second example). A class label may be considered OOV if its confidence score is below a threshold (e.g. 0.90 in the first example and 0.30 in the second example). The CLINC dataset by Larson et. al. is licensed under CC BY 3.0.

The first example in Table 1 shows rectification of misclassification error. The second example in Table 1 shows rectification of hallucinated (out-of-vocab) intent class label generation.

In the first example, paraphrases generated by PAG-LLM enable correct classification decisions with high confidence scores. Thus, even simple majority voting aggregation leads to the correct class prediction. In the second example, only Paraphrase 2 from PAG-LLM enables correct classification while remaining paraphrases and the original query have OOV class labels. PAG-LLM aggregates texts of input, paraphrases, their labels and confidences to finally predict the correct class label.

Figure 3:
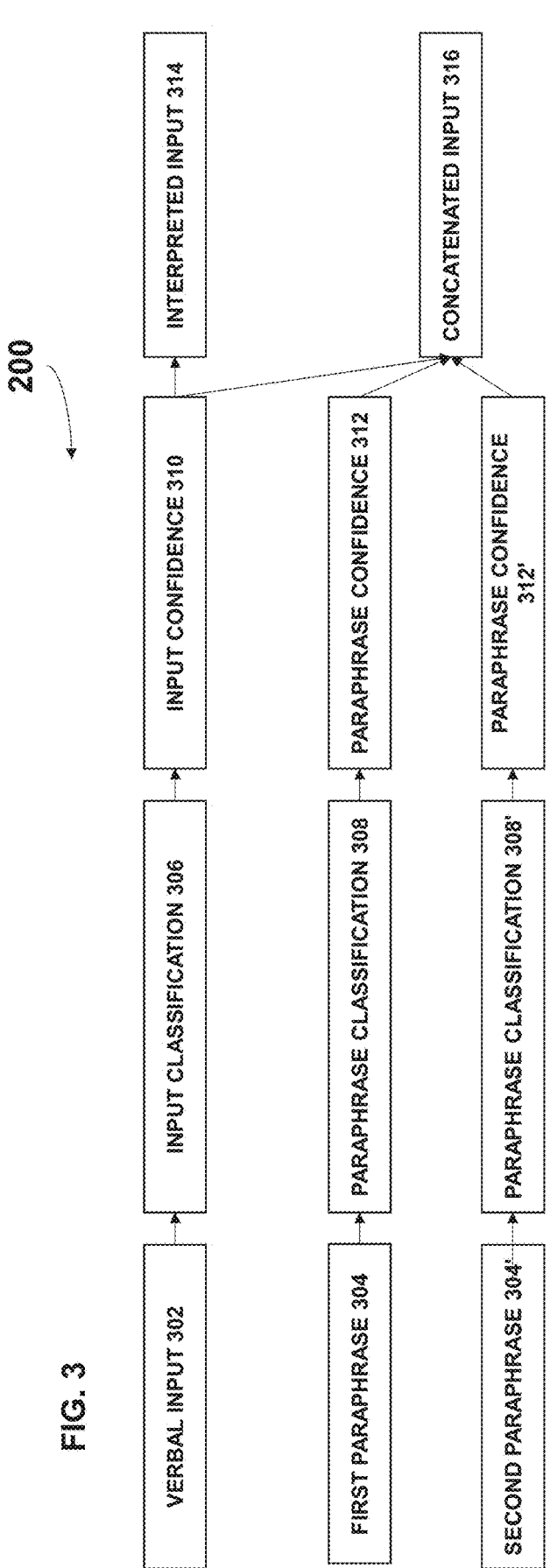
FIG. 3 is a flow chart of a method according to one or more embodiments.
Figure 4:
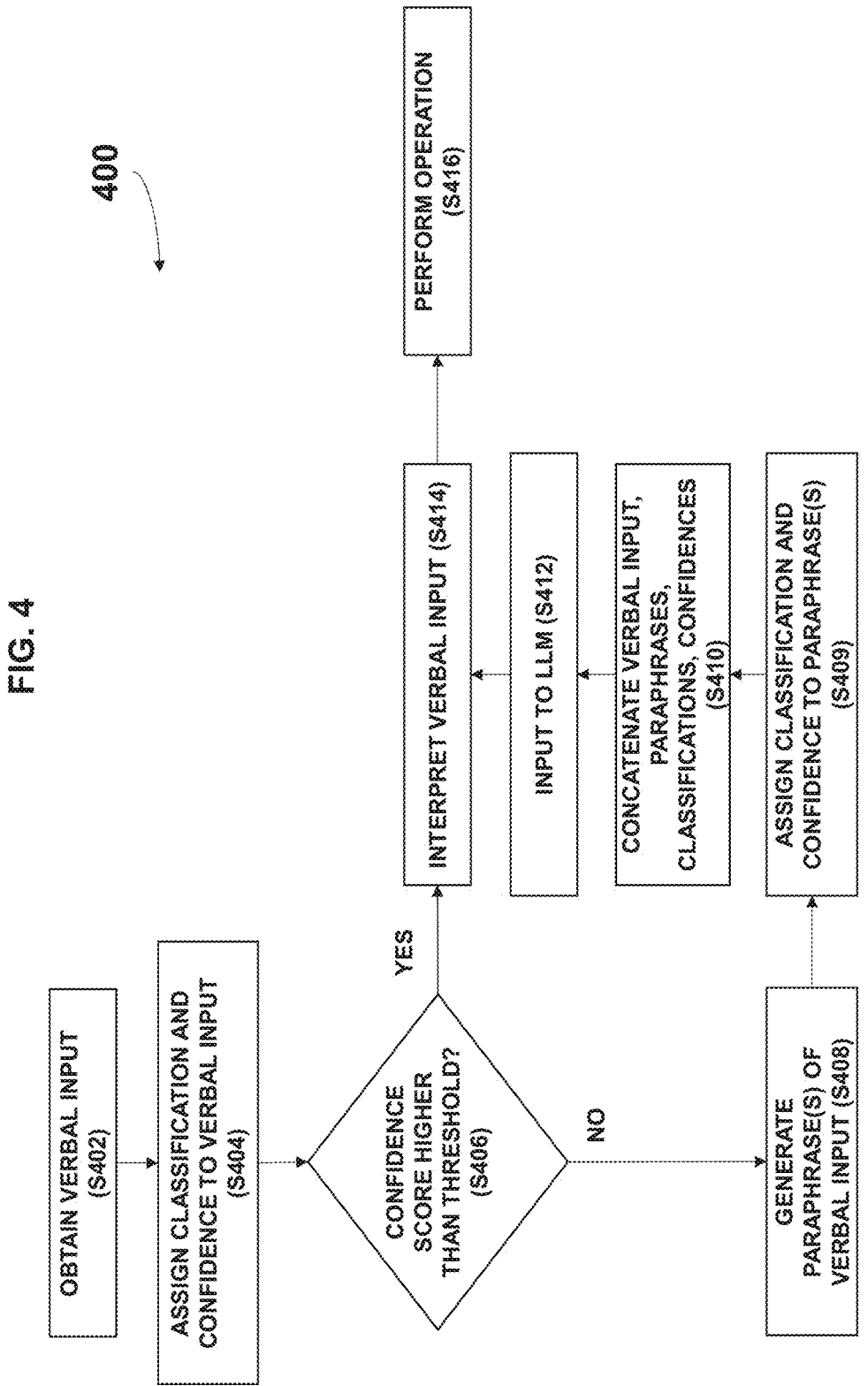
FIG. 4 is a flow chart of a method according to one or more embodiments.

FIGS. 3 and 4 show flowcharts of the PAG-LLM process according to one or more embodiments. The processes in FIGS. 3 and 4 can be used to process inputs shown in the first example and second example from TABLE 1. Verbal input 302 is obtained and input into the process (S402). Verbal input 302 may be voice that has been converted to text, or direct text input. Verbal input 302 can take the form of a question or query in several embodiments. In a first example, the query is "What is the day off request status?"

Verbal input 302 is classified at the input classification 306 operation (S404). In the first example, the query would be classified as "request_status." Along with the input classification 306, a confidence in the input classification is generated (input confidence 310). This input confidence 310 represents PAG-LLM's confidence that the input classification 306 is correct. In the first example, the input confidence 310 is on a scale of 0.00 to 1.00, and is 0.28.

If the input confidence 310 is higher than threshold τ, the verbal input 302 (S406), input classification 306, and input confidence 310, will be considered the interpreted input 314, and input into the LLM to answer the query (S412). In the case of the first example, the threshold t is between 0.87 and 0.97 (e.g. 0.90). Accordingly, input confidence 310 is not higher than threshold τ, and PAG-LLM generates a plurality of paraphrases (S408). Operation S406 may save computational resources by skipping operations S408 to S410 in situations where the initial verbal input 302 has a sufficiently high confidence score 310.

FIG. 3 shows two paraphrases (first paraphrase 304 and second paraphrase 304') being generated. However, in several embodiments more paraphrases are generated (see TABLE 1 below). As with verbal input 302, PAG-LLM generates paraphrase classification 308 and paraphrase classification 308', along with paraphrase confidence 312 and paraphrase confidence 312' (S409). After paraphrases 304, 304' and related information are generated, the verbal input 302, input classification 306, input confidence 310, first paraphrase 304, paraphrase classification 308, paraphrase confidence 312, second paraphrase 304', paraphrase classification 308', and paraphrase confidence 312' are concatenated to generate a concatenated input 316 (S410). The concatenated input may include all of the above-listed data.

Figure 5:
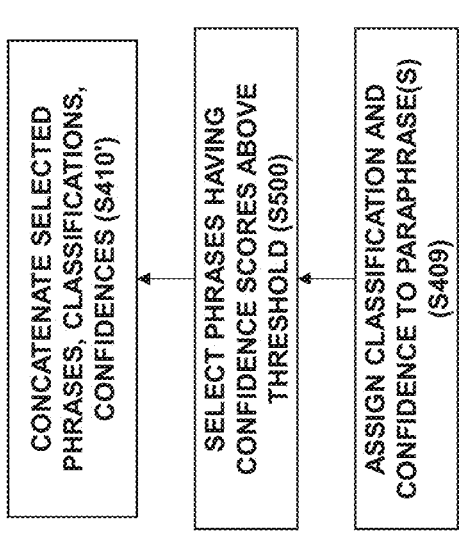
FIG. 5 is a flow chart of a method according to one or more embodiments.

In some embodiments, a pre-screening occurs prior to operation S410. In this pre-screening only phrases from among paraphrases 304, 304' and verbal input 302 that have confidence scores exceeding threshold τ are selected (S500) to be concatenated in operation S410'. This is shown in FIG. 5. Operation S500 may conserve computational resources by avoiding processing of low-confidence inputs.

The concatenated input 316 is then input into an LLM for processing (S412). In some embodiments, this LLM is the same LLM that generated the paraphrases 304, 304'. At this stage, the LLM interprets the concatenated input 316 to generate a final input (S414). This is performed by selecting one of the verbal input 302 and the paraphrases 304, 304' as the final interpreted input. The one of the verbal input 302 and paraphrases 304, 304' are selected based on the confidences 310, 312, 312' and classifications 306, 308, 308'. For example, the final input may be selected based on a majority vote. An input phrase having the highest confidence could be selected. Also, an input phrase having the highest confidence among phrases with the most common classification could be selected. In some embodiments, a more complex algorithm using different weightings is used to select the final input. In some embodiments, the LLM generates outputs based on all of the input phrases, and then aggregates the outputs to generate a final output.

In the first example from TABLE 1, "pto_request_status" will be selected as the classification, because all of the paraphrases generated this classification, mostly with very high confidence. Accordingly, in the first example, a misclassification error (classifying the original input as "request_status") is corrected.

Once the final input is selected (i.e. original input 302 or one of first paraphrase 304 and second paraphrase 304'), an operation is performed based on the final input (S416). In other words, the final input is fed into a process that produces a result output. In embodiments where the input is a query, the output may be an answer to the query. In the first example, an answer concerning the user's day off request status will be generated and output to the user via a user interface (e.g. speaker or display). The process that produces the output may be the same LLM that generated paraphrases 304, 304', or a different process or LLM.

The second example in TABLE 1 shows how an unseen label error is addressed. In the second example, the verbal input 302 is "what is the reason humans even exist." This is a difficult query for a chatbot to address, and may generate unpredictable and/or incorrect classifications. The input classification 306 is "explain_meaning_of_life," and the input confidence 310 is low at 0.11. Accordingly PAG-LLM generates paraphrases 304, 304'.

Figure 6:
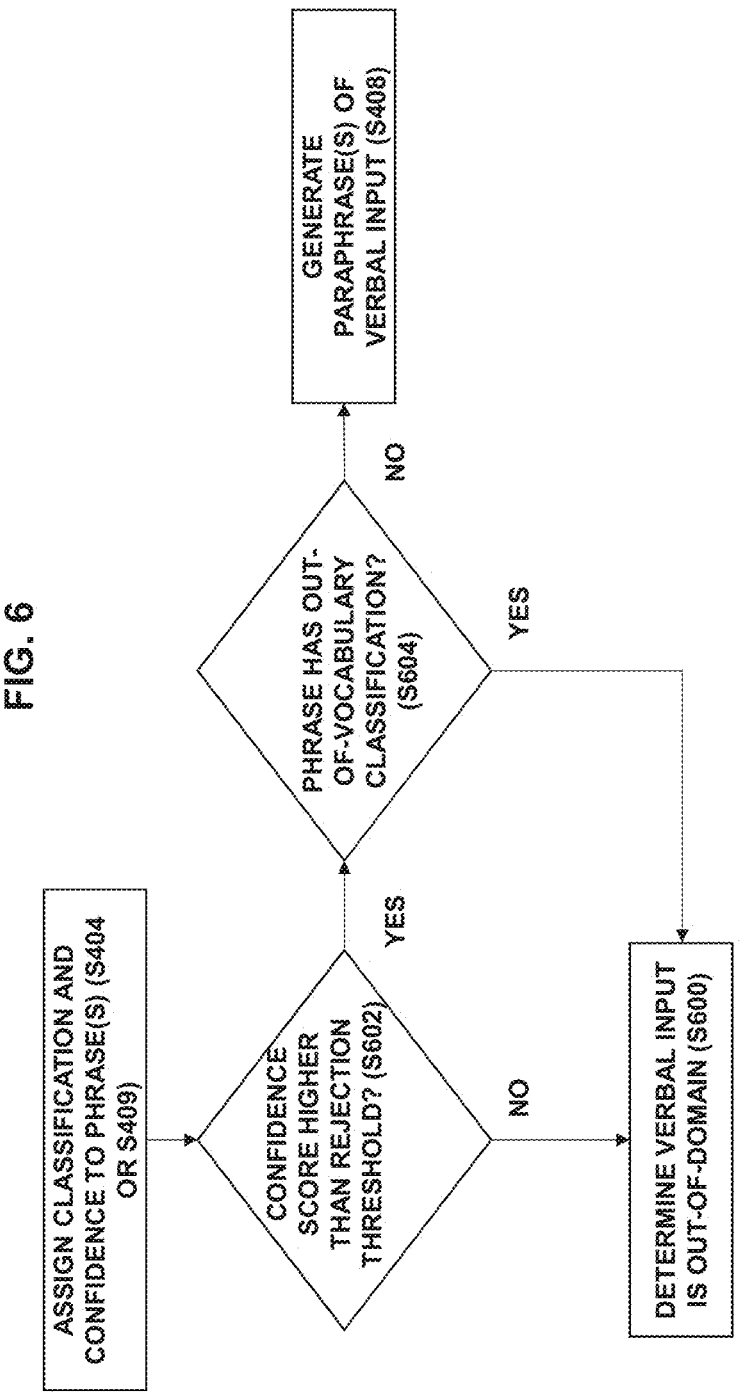
FIG. 6 is a flow chart of a method according to one or more embodiments.

Input confidence 310 is sufficiently low in the second example (0.11), that it may be considered out-of-domain or out-of-vocabulary (OOV), and therefore not addressable by the query answering process. Thus, generating paraphrases is helpful to properly address this query. As shown in FIG. 6, if the input confidence 310 is below threshold τ, the verbal input 302 may be considered out-of-domain (S600).

In some embodiments, the OOV/OOD label is determined as follows: (a) either confidence of predicted label from $LLM_{task}$ is below a rejection threshold $τ_r$ (which may be different from the threshold τ), or (b) confidence of predicted label is high (either from original $LLM_{task}$ or after paraphrasing) but the classification label text is out of the vocabulary.

Situation (a) is shown in FIG. 6. After classification and confidences are assigned to phrase(s) in S404 or S409, it is determined whether the confidence scores of the phrase(s) are higher than rejection threshold $τ_r$ (S602). If not, it is determined that the verbal input is OOD (S600). If so, it is determined whether the classification is OOV (S604).

Situation (b) is also shown in FIG. 6. After classifications and confidences are assigned to paraphrases, it is determined whether or not any of the paraphrases or the original input (the phrases) has a classification that is OOV (S604). If so, it is determined that that phrase is OOD (S600).

In the second example in TABLE 1, the paraphrases all have low confidences 312, 312'. Paraphrase 3 actually has no classification and is classified as NULL (i.e. OOV). The highest confidence 312, 312; is paraphrase 1, at 0.32, with classification "meaning_of_life." Accordingly, paraphrase 1 is selected as the final input.

Algorithms

Embodiments of the PAG-LLM process flow are formulated in Algorithm 1. The classifier $\text{LLM}_{classify}$ classifies the input query $Q_i$ to class $C_i$ with $p_i$ confidence. If the classification confidence $p_i > \tau$, $C_i$ is considered as the final label (depicted in FIG. 2A), else $\text{LLM}_{paraphrase}$ generates n paraphrases $$[PQ_i^1 \ldots PQ_i^n]$$

of $Q_i$. $\text{LLM}_{classify}$ classifies each of the paraphrased queries predicting classes $Cp_i$. $\text{LLM}_{aggregate}$ then aggregates the original query and its paraphrased queries, their predicted classes along with their confidences to predict the final class $C_i$.

---

Algorithm 1 PAG-LLM algorithm

---

$Q_i \leftarrow$ Input query
$C_i, p_i \leftarrow \text{LLM}_{classify} (Q_i)$
if $p_i > \tau$ then
  return $C_i$  ▷ Figure 1(A)
else  ▷ If confidence is $< \tau$, invoke PAG-LLM
  $[PQ_i^1 \ldots PQ_i^n] \leftarrow \text{LLM}_{paraphrase} (Q_i)$
  Predictions $= [C_i, p_i, Q_i]$
  for $PQ \leftarrow PQ_i^1$ to $PQ_i^n$ do
    $Cp_i, pp_i \leftarrow \text{LLM}_{classify} (PQ)$
    Predictions.insert($[Cp_i, pp_i, PQ]$)
  end for
  $C_i, p_i \leftarrow \text{LLM}_{Aggregate} (\text{Predictions})$
  return $C_i$
end if

---

Fine-Tuning

As shown in FIG. 2B, PAG uses the LLM for paraphrasing, classification, and aggregating. The LLM may be fine-tuned on instructions for each of these 3 tasks. For paraphrasing, the LLM may be fine-tuned on a paraphrasing dataset. The LLM may be fine-tuned until validation performance converges. For aggregation fine-tuning, predictions on original and paraphrased queries are generated from validation data. The original query, all paraphrased queries and their prediction labels (and their corresponding confidence scores) may be concatenated as input to train the LLM to predict the final output.

Embodiments herein fine-tune three different (small parameter sized) adaptor layers for all the 3 tasks—paraphrasing, classification, and aggregation. Similarly, embodiments can fine-tune many more adaptor layers for any other specific tasks such as QA, Summarization, Conversational QA and Dialogue, etc.

Applications

Embodiments described herein are also capable of performing generation tasks such as dialogue systems, question answering, and summarization.

Embodiments can be integrated for any decision-making NLP system for lowering the errors. Although the disclosure focuses on a use case of PAG-LLM for intent classification in a natural language understanding (NLU) system, our algorithm can be extended to any decision making NLP system.

Embodiments can also be used for paraphrasing user questions to show related and diverse results. The paraphrasing component can be utilized to show a "recommended" query to the user allowing them to better ask their question similar to google search. The diverse paraphrased queries can also show diverse results resulting in higher recall of the correct response.

Embodiments can be used to tailor an LLM for multiple retrieval-augmented generation (RAG)-based tasks and applications. Embodiments can be extended to improve robustness of the LLM on any task, but specifically natural language generation tasks.

Embodiments can be implemented as a voice assistant for smart home functionality. For example PAG-LLM can be used to paraphrase the user query multiple times and aggregate to improve the response accuracy from the voice assistant, especially for ambiguous utterances where the user intent could be one of several alternatives. For example "It is a bit drafty in the living room" could mean several possible requests to a smart home (e.g. lower the AC, close the window, etc. . . . ).

Embodiments can be implemented as a quality assurance assistant: PAG-LLM can be used to paraphrase a user question multiple ways to detect the intent behind the user question better and improve response accuracy.

Advantages

Embodiments of the methods herein can be further streamlined by generating paraphrases and executing classification simultaneously for each paraphrased query, instead of generating N paraphrases and then executing N classifications. In this way, if PAG-LLM observes same classification label with just two or three paraphrases with high confidences, it can terminate the process early and predict this classification label.

Certain embodiments are highly effective for hard examples where the LLM classifier is uncertain, and reduce the critical misclassification and hallucinated label generation errors. Embodiments herein can also improve efficiency by lowering inference times for groups of queries. This improvement results from the low confidence inquiries being efficiently handled, improving overall performance.

Previous techniques have trained generative NLP models on original query and its paraphrases as a data-augmentation step. All the previous works report a drop in performance on the human label evaluation set. One or more embodiments can train an LLM for classification only on the original training data. If the classification confidence is low, paraphrasing and aggregation is executed only during inference, making the overall approach more compute friendly during training time and also improves the end performance. Moreover, in some embodiments, a single LLM can be used instead of multiple specialized LLMs.

Embodiments of the method and device described herein improve the functioning of a computer by improving quality of responses to verbal queries, conserving computational resources, and increasing speed. These problems of computational waste, slow responsiveness, and poor results are confined to the realm of computation and networks. Thus, embodiments herein are necessarily rooted in computer technology in order to overcome a problem specifically arising in the realm of computer networks.

Meanwhile, according to one or more embodiments of the disclosure, the various embodiments described above may be implemented with software including instructions stored in a machine-readable storage media (e.g., computer). The machine may call an instruction stored in a storage medium, and as an apparatus operable according to the called instruction, may include an electronic apparatus (e.g., electronic apparatus (A)) according to the above-mentioned embodiments. Based on a command being executed by a processor, the processor may directly or using other elements under the control of the processor perform a function relevant to the command. The command may include a code generated by a compiler or executed by an interpreter. The machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments of the disclosure, a method according to the various embodiments described above may be provided included a computer program product. The computer program product may be exchanged between a seller and a purchaser as a commodity. The computer program product may be distributed in a form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments of the disclosure, the various embodiments described above may be implemented in a recordable medium which is readable by computer or an apparatus similar to computer using software, hardware, or a combination thereof. In some cases, the embodiments described herein may be implemented by the processor itself. According to a software implementation, embodiments such as procedures and functions described herein may be implemented with separate software modules. Each of the above-described software modules may perform one or more of the functions and operations described herein Meanwhile, computer instructions for performing processing operations of the machine according to the various embodiments described above may be stored in a non-transitory computer-readable medium. The computer instructions stored in this non-transitory computer-readable medium may cause a specific device to perform the processing operations in the machine according to the above-described various embodiments when executed by the processor of the specific device. The non-transitory computer-readable medium may refer to a medium that stores data semi-permanently rather than storing data for a very short time, such as a register, a cache, a memory, or the like, and is readable by the machine. Specific examples of the non-transitory computer-readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective relevant elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While certain embodiments of the disclosure has been particularly shown and described, it will be understood that various changes in form and details may be made therein without departing from the spirit and scope of the following claims.

What is claimed is:

1. A method of interpreting a verbal input, the method comprising:

obtaining a verbal input;

assigning a meaning classification to the verbal input, and a confidence score to the meaning classification; and based on the confidence score corresponding to the meaning classification of the verbal input being less than or equal to a threshold, generating at least one paraphrase of the verbal input using at least one large language model (LLM);

assigning the meaning classification to the at least one paraphrase, and the confidence score to the meaning classification;

concatenating the verbal input, the at least one paraphrase, the meaning classification, and the confidence score to generate a concatenated input;

inputting the concatenated input into the at least one LLM;

selecting one of the at least one paraphrase or the verbal input, and its corresponding meaning classification, as an interpreted verbal input and an interpreted meaning classification, based on an output of the at least one LLM generated from the concatenated input; and executing an operation based on at least one of the interpreted verbal input or the interpreted meaning classification.

2. The method of claim 1, further comprising:

based on the confidence score corresponding to the meaning classification of the verbal input being higher than the threshold, inputting the verbal input into the at least one LLM;

selecting the verbal input and its corresponding meaning classification as the interpreted verbal input and the interpreted meaning classification, based on an output of the at least one LLM generated from the verbal input; and executing the operation based on the interpreted verbal input and its corresponding meaning classification.

3. The method of claim 1, further comprising:

based on the confidence score of the interpreted verbal input being less than or equal to the threshold, determining that the verbal input is out-of-domain.

4. The method of claim 1, further comprising:

prior to concatenating the verbal input, the at least one paraphrase, the meaning classification, and the confidence score, selecting phrases from among the verbal input and the at least one paraphrase that have confidence scores exceeding the threshold, wherein the concatenation is performed on the selected phrases and their corresponding meaning classifications and confidence scores to obtain the concatenated input.

5. The method of claim 1, wherein the verbal input is a user inquiry, and wherein the operation executed is to generate and output a response to the user inquiry.

13

6. The method of claim 5, wherein the at least one LLM is used to generate and output the response to the user inquiry.

7. An electronic device, comprising:

at least one processor;

at least one memory configured to store instructions that, when executed by the at least one processor, cause the electronic device to:

obtain a verbal input;

assign a meaning classification to the verbal input, and a confidence score to the meaning classification; and based on the confidence score corresponding to the meaning classification of the verbal input being less than or equal to a threshold, generate at least one paraphrase of the verbal input using at least one large language model (LLM);

assign the meaning classification to the at least one paraphrase, and the confidence score to the meaning classification;

concatenate the verbal input, the at least one paraphrase, the meaning classification, and the confidence score to generate a concatenated input;

input the concatenated input into the at least one LLM;

select one of the at least one paraphrase or the verbal input, and its corresponding meaning classification, as an interpreted verbal input and an interpreted meaning classification, based on an output of the at least one LLM generated from the concatenated input; and execute an operation based on at least one of the interpreted verbal input or the interpreted meaning classification.

8. The electronic device of claim 7, wherein the instructions further cause the electronic device to:

based on the confidence score corresponding to the meaning classification of the verbal input being higher than the threshold, input the verbal input into the at least one LLM;

select the verbal input and its corresponding meaning classification as the interpreted verbal input and the interpreted meaning classification, based on an output of the at least one LLM generated from the verbal input; and execute the operation based on the interpreted verbal input and its corresponding meaning classification.

9. The electronic device of claim 7, wherein the instructions further cause the electronic device to:

based on the confidence score of the interpreted verbal input being less than or equal to the threshold, determine that the verbal input is out-of-domain.

10. The electronic device of claim 7, wherein the instructions further cause the electronic device to:

prior to concatenating the verbal input, the at least one paraphrase, the meaning classification, and the confidence score, select phrases from among the verbal input and the at least one paraphrase that have confidence scores exceeding the threshold, wherein the concatenation is performed on the selected phrases and their corresponding meaning classifications and confidence scores to obtain the concatenated input.

11. The electronic device of claim 7, wherein the verbal input is a user inquiry, and wherein the operation executed is to generate and output a response to the user inquiry.

12. The electronic device of claim 11, wherein the at least one LLM is used to generate and output the response to the user inquiry.

13. The electronic device of claim 11, further comprising:

a display, wherein the operation executed is to generate and display the response to the user inquiry on the display.

14. The electronic device of claim 11, further comprising:

a speaker, wherein the operation executed is to generate and play the response to the user inquiry on the speaker.

15. A non-transitory computer readable medium comprising instructions which, when the instructions are executed by at least one processor, cause the at least one processor to carry out:

obtaining a verbal input;

assigning a meaning classification to the verbal input, and a confidence score to the meaning classification; and based on the confidence score corresponding to the meaning classification of the verbal input being less than or equal to a threshold, generating at least one paraphrase of the verbal input using at least one large language model (LLM);

assigning the meaning classification to the at least one paraphrase, and the confidence score to the meaning classification;

concatenating the verbal input, the at least one paraphrase, the meaning classification, and the confidence score to generate a concatenated input;

inputting the concatenated input into the at least one LLM;

selecting one of the at least one paraphrase or the verbal input, and its corresponding meaning classification, as an interpreted verbal input and an interpreted meaning classification, based on an output of the at least one LLM generated from the concatenated input; and executing an operation based on at least one of the interpreted verbal input or the interpreted meaning classification.

16. The non-transitory computer readable medium of claim 15, wherein the instructions further cause the at least one processor to carry out:

based on the confidence score corresponding to the meaning classification of the verbal input being higher than the threshold, inputting the verbal input into the at least one LLM;

selecting the verbal input and its corresponding meaning classification as the interpreted verbal input and the interpreted meaning classification, based on an output of the at least one LLM generated from the verbal input; and executing the operation based on the interpreted verbal input and its corresponding meaning classification.

17. The non-transitory computer readable medium of claim 15, wherein the instructions further cause the at least one processor to carry out:

based on the confidence score of the interpreted verbal input being less than or equal to the threshold, determining that the verbal input is out-of-domain.

18. The non-transitory computer readable medium of claim 15, wherein the instructions further cause the at least one processor to carry out:

prior to concatenating the verbal input, the at least one paraphrase, the meaning classification, and the confidence score, selecting phrases from among the verbal input and the at least one paraphrase that have confidence scores exceeding the threshold, wherein the concatenation is performed on the selected phrases and their corresponding meaning classifications and confidence scores to obtain the concatenated input.

19. The non-transitory computer readable medium of claim 15, wherein the verbal input is a user inquiry, and wherein the operation executed is to generate and output a response to the user inquiry.

20. The non-transitory computer readable medium of claim 19, wherein the at least one LLM is used to generate and output the response to the user inquiry.

\* \* \* \* \*